(12) United States Patent
Qu et al.

(10) Patent No.: US 12,248,133 B2
(45) Date of Patent: Mar. 11, 2025

(54) METHODS AND APPARATUS FOR IN VIVO HIGH RESOLUTION MULTIPHOTON MICROSCOPY

(71) Applicant: The Hong Kong University of Science and Technology, Hong Kong (CN)

(72) Inventors: Jianan Qu, Hong Kong (CN); Zhongya Qin, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 785 days.

(21) Appl. No.: 17/529,219

(22) Filed: Nov. 17, 2021

(65) Prior Publication Data

US 2022/0236547 A1  Jul. 28, 2022

Related U.S. Application Data

(60) Provisional application No. 63/140,261, filed on Jan. 22, 2021.

(51) Int. Cl.
*G02B 21/00* (2006.01)
*G02B 27/00* (2006.01)

(52) U.S. Cl.
CPC ....... *G02B 21/006* (2013.01); *G02B 21/0048* (2013.01); *G02B 21/008* (2013.01); *G02B 27/0068* (2013.01)

(58) Field of Classification Search
CPC ............ G02B 21/0048; G02B 21/0064; G02B 27/0068
See application file for complete search history.

(56) References Cited

U.S. PATENT DOCUMENTS

| 10,962,752 B2 | 3/2021 | Judkewitz et al. | |
| 2019/0004302 A1* | 1/2019 | Imoto | G01N 21/6458 |
| 2021/0048657 A1* | 2/2021 | Ji | G02B 21/0032 |

FOREIGN PATENT DOCUMENTS

| CN | 110132910 A | 8/2019 |
| CN | 111537478 A | 8/2020 |

OTHER PUBLICATIONS

Atsushi Doi et al., High-resolution imaging in two-photon excitation microscopy using in situ estimations of the point spread function, Biomedical Optics Express 9, 202-213 (2018).

(Continued)

*Primary Examiner* — Ephrem Z Mebrahtu
(74) *Attorney, Agent, or Firm* — Idea Intellectual Limited; Margaret A. Burke; Sam T. Yip

(57) ABSTRACT

Provided herein is a method for identifying and correcting optical aberrations within a sample under optical microscopy. The method includes providing a plurality of optical beams including at least a first optical beam and a second optical beam; modulating at least one of the optical beams at one or more frequencies; providing a combined optical beam at least partially superimposed in time by the first optical beam and the second optical beam; focusing the combined optical beam into the sample; detecting a first signal excited by the combined optical beam in the sample; demodulating the first signal by at least one lock-in amplifier to obtain a second signal including performing a plurality of measurements of spatial positions of the first optical beam with respect to the second optical beam; identifying and correcting the optical aberrations by the second signal through obtaining the electric-field point spread function of the optical beams.

20 Claims, 10 Drawing Sheets

(56) References Cited

OTHER PUBLICATIONS

Yao Zheng et al., Two-photon focal modulation microscopy for high-resolution imaging in deep tissue, Journal of Biophotonics 12, 1 (2019), p. 1-9.

Ioannis N. Papadopoulos et al., Scattering compensation by focus scanning holographic aberration probing (F-SHARP), Nature Photonics 11, 116-123 (2017).

Ioannis N. Papadopoulos et al., Dynamic conjugate F-SHARP microscopy, Light: Science & Applications 9, 110 (2020), pp. 1-8.

* cited by examiner

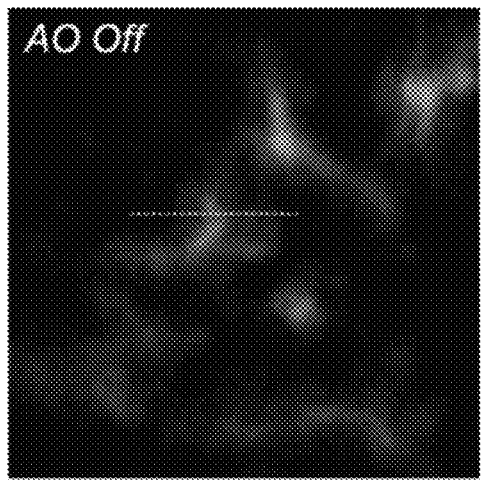
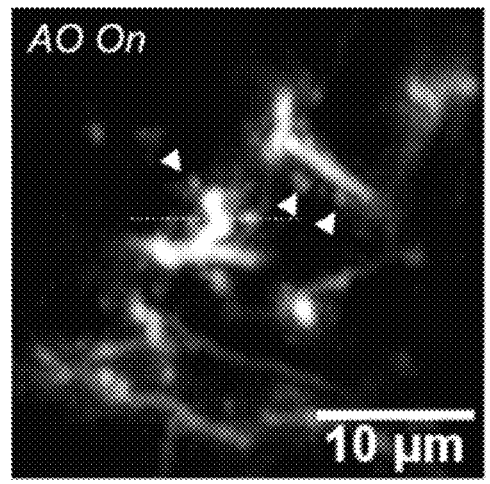
FIG. 7E
FIG. 7F
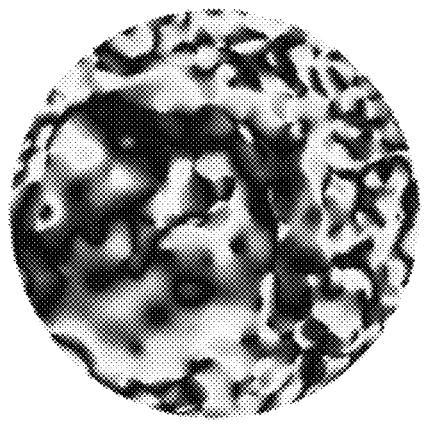
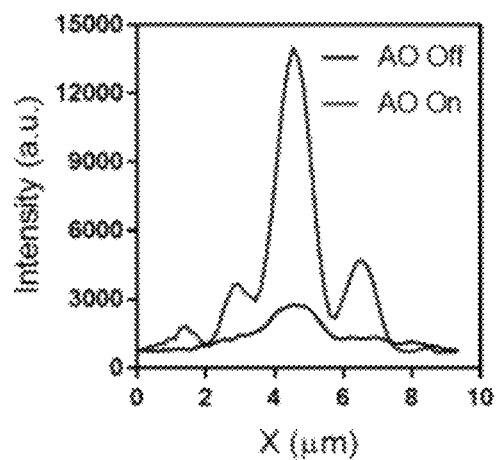
FIG. 7G
FIG. 7H

METHODS AND APPARATUS FOR IN VIVO HIGH RESOLUTION MULTIPHOTON MICROSCOPY

CROSS-REFERENCE TO RELATED APPLICATIONS

The present application claims priority from a U.S. provisional patent application No. 63/140,261 filed Jan. 22, 2021, and the disclosure of which is incorporated herein by reference in its entirety.

FIELD OF THE INVENTION

The present invention provides a method and system for identifying and correcting optical aberrations within a sample under optical microscopy. More specifically, a non-invasive method and system arrangement are provided to accurately measure an aberrated electric-field (E-field) PSF of an excitation laser within a sample, leading to a near diffraction-limited resolution imaging.

BACKGROUND

Optical microscopy has for a long time been an indispensable tool for biological and biomedical research. In conjunction with various fluorescent proteins and indicators, multiphoton microscopy allows direct visualization of sub-cellular structures and continuous monitoring of dynamic biological activities at spatiotemporal scales spanning orders of magnitude in living animals. However, when imaging deep into samples, the microscopic performance is detrimentally affected by the optical aberrations of the specimens due to refractive index variations of biological tissues. These aberrations prevent the formation of diffraction-limited focus inside the specimens and ultimately degrade the resolution and contrast of microscope images. To address these issues, adaptive optics (AO), an optical technique, has been introduced to optical microscopy to compensate for a wavefront distortion arising from the aberrations. If the wavefront distortion is identified, a wavefront corrector such as deformable mirror (DM) or spatial light modulator (SLM) can be employed to generate a compensatory distortion against the excitation and/or emission light to cancel all the aberrations and recover the optimal imaging resolution.

Previous efforts for implementing AO in optical microscopy mainly differ in how the aberration is measured and can be classified to either direct or indirect wavefront sensing. In direct wavefront measurement, aberrations are determined directly from the received wavefront of a "guide star" with a wavefront sensor, similar to that in astronomical AO. This information is then used to drive the shape of a deformable mirror and generate a compensatory distortion to minimize the total aberrations. Direct wavefront sensing is fast and conceptually simple. However, it relies on the photons that have not been scattered (ballistic photons) and thus are best suited for the transparent specimens. In indirect approaches, iterative algorithms are adopted to find the optimal corrective wavefront. For example, modal AO techniques make use of a deformable mirror that iterates through low-order deformations, and pupil segmentation approaches acquire images through segments of the objective back aperture to estimate the phase gradient in order to correct aberration. The indirect approaches are usually time-consuming and can only deal with low-order aberrations.

Recently, a sensorless technique termed focus scanning holographic aberration probing (F-SHARP) was developed to flexibly correct both low- and high-order aberrations of the imaging samples (shown in I. N. Papadopoulos, J.-S. Jouhanneau, J. F. A. Poulet, and B. Judkewitz, "Scattering compensation by focus scanning holographic aberration probing (F-SHARP)," Nature Photonics 11, 116 (2017) and I. N. Papadopoulos, J.-S. Jouhanneau, N. Takahashi, D. Kaplan, M. Larkum, J. Poulet, and B. Judkewitz, "Dynamic conjugate F-SHARP microscopy," Light: Science & Applications 9, 110 (2020).). By utilizing a nonlinear interaction of a strong stationary beam and a weak scanning beam, F-SHARP measures the amplitude and phase of the electric-field (E-field) point-spread function (PSF) inside a medium, which contains the aberration information. Because F-SHARP is not based on iterating through the modes of the wavefront shaper, the correction speed is not limited to the refresh rate of the wavefront-shaping element, which enables the use of a high-pixel-count liquid crystal spatial light modulator (SLM) and allows for correction of a large (>1000) number of modes at high correction speeds. However, the originally proposed F-SHARP uses a four-step phase stepping scheme to measure the E-field PSF. Because of the large intensity difference between the strong and weak optical beams, the interference signal for deriving the PSF is only a few percent of the direct current (DC) background signal and will further decrease when the weak beam is scanned away from the strong beam for the measurement of the side lobes of the PSF, which yield poor signal-noise-ratio (SNR) and large errors in AO correction.

In view of the disadvantages of the existing methods and systems for identifying and correcting the optical aberrations, there is a need for providing a novel approach to suppress noise in PSF measurement and enable accurate measurement and correction of optical aberrations.

SUMMARY OF THE INVENTION

Accordingly, a first aspect of the present invention provides a method for identifying and correcting optical aberrations within a sample under optical microscopy, which includes the steps of (1) providing a plurality of optical beams including at least a first optical beam and a second optical beam, followed by modulating at least one of the optical beams at one or more frequencies, where the intensity of one of the optical beams is higher than the other; (2) combining the first optical beam and the second optical beam to provide a combined optical beam, where the first optical beam and the second optical beam are at least partially superimposed in time; (3) focusing the combined optical beam into the sample, followed by detecting a first signal excited by the combined optical beam in the sample; (4) demodulating the first signal by at least one lock-in amplifier to obtain a second signal including performing a plurality of measurements of the spatial positions of the first optical beam with respect to the second optical beam; and (5) identifying and correcting the optical aberrations by the second signal through obtaining the electric-field point spread function.

In one embodiment of the first aspect of the present invention, there is provided a method where the modulating is selected from phase modulation, intensity modulation, or any combination thereof.

In one embodiment of the first aspect of the present invention, there is provided a method where in the phase modulation, at least one measurement is performed for each spatial position of the first optical beam with respect to the second optical beam.

In one embodiment of the first aspect of the present invention, there is provided a method where in the intensity modulation, at least two measurements are performed for each spatial position of the first optical beam with respect to the second optical beam, and where the relative phase between the first and the second optical beams is altered between the at least two measurements.

In one embodiment of the first aspect of the present invention, there is provided a method where the identified optical aberrations are for correcting the wavefront of the optical beams.

In one embodiment of the first aspect of the present invention, there is provided a method where the reference frequency of the at least one lock-in amplifier is selected from modulation frequency, harmonic frequency, or a combination thereof.

In one embodiment of the first aspect of the present invention, there is provided a method where one of the optical beams is for imaging a medium while the other optical beams are hindered.

In one embodiment of the first aspect of the present invention, the method for identifying and correcting the optical aberrations within the sample under optical microscopy further includes repeating steps (4) to (5) to obtain an accurate estimation of the optical aberration.

In one embodiment of the first aspect of the present invention, there is provided a method where more than one optical beam is modulated selected from phase modulation, intensity modulation, or a combination thereof at one or more frequencies to generate signals, and where more than one lock-in amplifiers are configured to demodulate the signals.

A second aspect of the present invention provides an optical system for identifying and correcting optical aberrations within a sample under optical microscopy by phase modulation. The system comprises at least one optical beam generating device, at least one optical phase modulator, at least one optical beam scanning device, at least one optical beam combination device, at least one wavefront correction device, at least one focusing device, and at least one lock-in amplifier. The optical beam generating device is configured to provide optical beams including at least a first optical beam and a second optical beam, where the intensity of one of the optical beams is higher than the other, then the optical phase modulator is configured to perform the phase modulation of at least one of the optical beams. The optical beam scanning device is configured to provide a spatial displacement of the first optical beam with respect to the second optical beam. The optical beam combination device is configured to superimpose the first optical beam and the second optical beam to obtain a combined optical beam such that the first and second optical beams are at least partially overlapped in time. The wavefront correction device is configured to modify the wavefront of the optical beams. The focusing device is configured to focus the combined optical beam into an imaging sample, a first signal is excited from the imaging sample by the combined optical beam, where a detection device is configured to detect the first signal. The lock-in amplifier is configured to demodulate the first signal to obtain a second signal, where the electric-field point spread function of the optical beams is obtained from the second signal so as to identify and correct the optical aberrations within the sample.

In one embodiment of the second aspect of the present invention, there is provided a system, where the optical beam generating device includes a light source and a beam splitting device; where the light source is configured to generate the optical beams; where the beam splitting device is configured to split the optical beams into the first optical beam and the second optical beams; where the splitting device is selected from a polarized beam splitter, non-polarized beam splitter, acoustic optical modulator, or any combination thereof.

In one embodiment of the second aspect of the present invention, there is provided a system, where the phase modulation is a linear function in time over the full phase ranging from $-\pi$ to $\pi$, and the phase modulation is performed by either altering the optical path length or shifting the optical frequency of at least one of the optical beams, where the alteration of the optical path length is performed by an electro-optical phase modulator, or piezo stage or any combination thereof, where the shifting the optical frequency is performed by selecting from acoustic optical modulator, or acoustic optical frequency shifter or any combination thereof.

In one embodiment of the second aspect of the present invention, there is provided a system, where the system further comprises an optical path adjusting device configured to vary the optical path of one of the two optical beams such that the two optical beams are superimposed in time.

In one embodiment of the second aspect of the present invention, there is provided a system, where the wavefront correction device is selected from liquid crystal light spatial modulator, deformable mirror, digital micromirror device, or any combination thereof.

In one embodiment of the second aspect of the present invention, there is provided a system, where the system further comprises a device configured to generate a reference signal to the lock-in amplifier.

In one embodiment of the second aspect of the present invention, there is provided a system, where the second signal includes the in-phase and quadrature outputs from the lock-in amplifier, which are measured for a plurality of spatial positions of the first optical beam with respect to the second optical beam.

A third aspect of the present invention provides an optical system for identifying and correcting optical aberrations by intensity modulation. The system comprises at least one optical beam generating device, at least one optical intensity modulator, at least one phase shifting device, at least one optical beam scanning device, at least one optical beam combination device, at least one wavefront correction device, at least one focusing device, and at least one lock-in amplifier. The optical beam generating device is configured to provide optical beams including at least one first optical beam and at least one second optical beam, where the intensity of one of the optical beams is higher than the other, then the optical intensity modulator is configured to perform the phase modulation of at least one of the optical beams. The phase shifting device is configured to perform the phase shift of at least one of the optical beams. The optical beam scanning device is configured to provide a spatial displacement of the first optical beam with respect to the second optical beam. The optical beam combination device is configured to superimpose the first optical beam and the second optical beam to obtain a combined optical beam such that the first and second optical beams are at least partially overlapped in time. The wavefront correction device is configured to modify the wavefront of the optical beams. The focusing device is configured to focus the combined optical beam into an imaging sample, a first signal is excited from the imaging sample by the combined optical beam, where a detection device is configured to detect the first signal. The lock-in amplifier is configured to demodulate the first signal to obtain a second signal, where the electric-field point spread function of the optical beams is obtained from the second signal so as to identify and correct the optical aberrations within the sample.

In one embodiment of the third aspect of the present invention, there is provided a system, where the optical intensity modulator is selected from electro optical intensity modulator, acoustic optical modulator, photoelastic modulator, optical chopper, or any combination thereof.

In one embodiment of the third aspect of the present invention, there is provided a system, where the phase shifting device is selected from electro-optical phase modulator, piezo stage, MEMES actuator, or any combination thereof.

In one embodiment of the third aspect of the present invention, there is provided a system, where the second signal are obtained by two measurements for each spatial position of the first optical beam with respect to the second optical beam, where the relative phase between the first and the second optical beam is altered between the two measurements.

BRIEF DESCRIPTION OF THE DRAWINGS

The appended drawings, where like reference numerals refer to identical or functionally similar elements, contain figures of certain embodiments to further illustrate and clarify the above and other aspects, advantages and features of the present invention. It will be appreciated that these drawings depict embodiments of the invention and are not intended to limit its scope. The invention will be described and explained with additional specificity and detail through the use of the accompanying drawings in which:

FIG. 7E shows the two-photon fluorescence image of fluorescent protein labeled neuronal dendrites in a living mouse at 200 μm under a 50-μm-thickness skull without AO correction.

FIG. 7F shows the two-photon fluorescence image of fluorescent protein labeled neuronal dendrites in a living mouse at 200 μm under a 50-μm-thickness skull with AO correction.

FIG. 7G shows the optical aberration identified after three iterations by the method according to one embodiment of the present invention.

FIG. 7H illustrates the intensity profile along the dashed line in FIG. 7E and FIG. 7F.

DEFINITIONS

Figure 1:
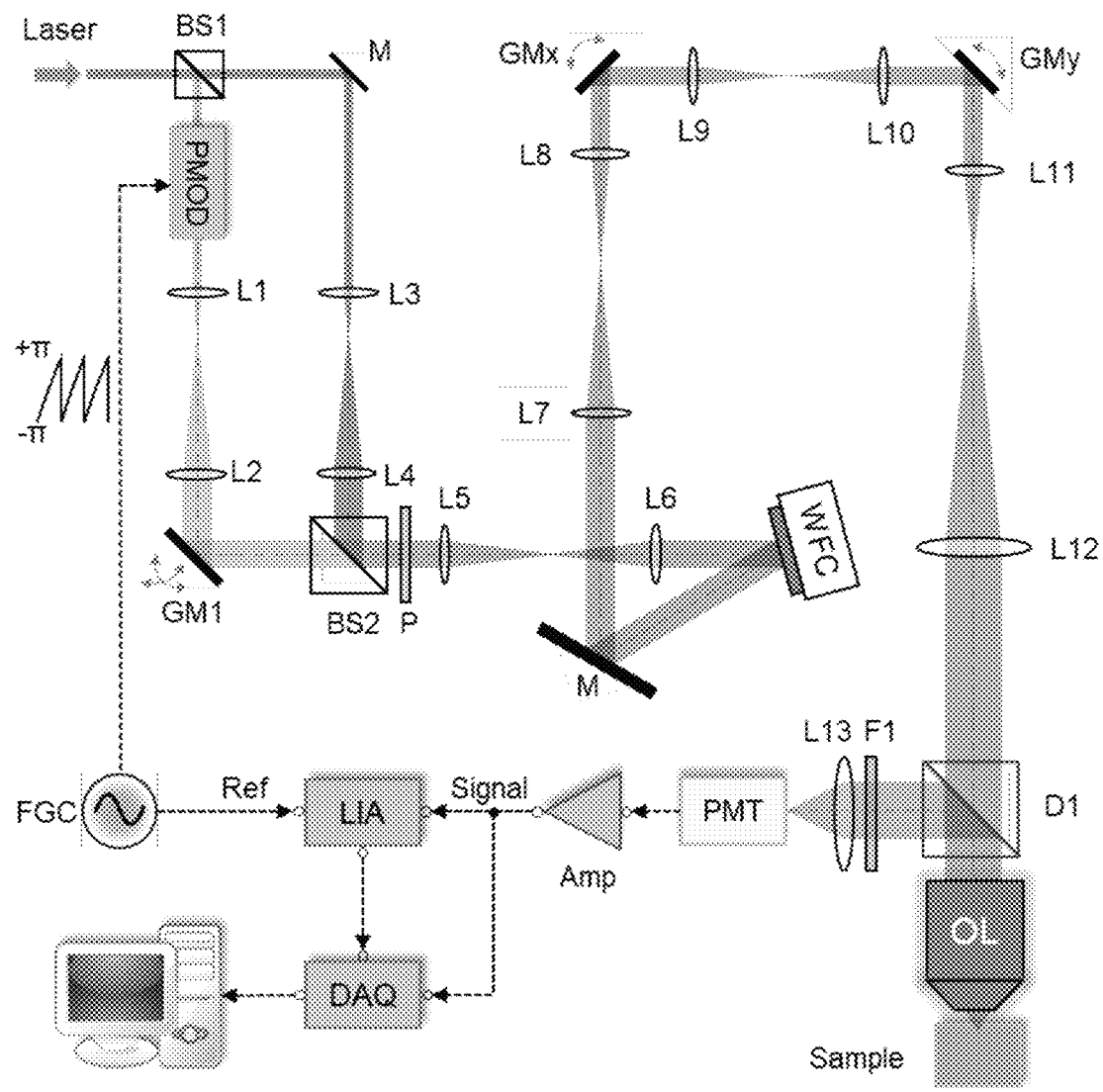
FIG. 1 is a schematic diagram of the present system with a phase modulator according to one embodiment of the present invention.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of preparation described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step (1), Step (2), Step (3), Step (4), and Step (5)" shall be construed to mean step (1) is carried out first, step E is carried out last, and steps (2), (3), and (4) can be carried out in any sequence between steps (1) and (5), and that the sequence still falls within the literal scope of the claimed process. A given step or sub-set of steps can also be repeated.

DETAILED DESCRIPTION

In the following description, the present invention is set forth as preferred examples. It will be apparent to those skilled in the art that modifications, including additions and/or substitutions may be made without departing from the scope and the spirit of the invention. Specific details may be omitted so as not to obscure the invention; however, the disclosure is written to enable one skilled in the art to practice the teachings herein without undue experimentation.

In optical microscopy of heterogeneous sample, both imaging resolution and depth are drastically degraded by the aberrations induced by the imaged sample and imaging system itself. The present invention provides methods and systems for accurately measuring and correcting the optical aberrations encountered in multiphoton microscopy. Specifically, a non-invasive method to accurately measure the aberrated electric-field (E-field) PSF of excitation laser inside the sample is provided, which enables identification and correction of the wavefront aberrations to achieve near-diffraction-limited resolution imaging.

Accordingly, an object of the invention is to identify the wavefront distortions of in vivo multiphoton microscopy, thereby providing AO corrections to system and/or sample induced aberrations. The principle is based on the measurement of the amplitude and phase of the E-field PSF. If the E-field PSF information is known, then the overall wavefront distortion is obtained by the Fourier transform of the E-field PSF and can be corrected by using a wavefront corrector. The optical system is arranged according to a conventional multiphoton microscopy with several important modifications: in addition to the excitation beam, a second optical beam has been provided, which is weaker than the excitation beam and modulated at a specific frequency f. The modulation could be either a phase modulation or an intensity modulation. The two beams are then combined and focused into the specimens to excite nonlinear optical signals (e.g. two- or three-photon excited fluorescence, second- or third-harmonic generation, coherent Raman scattering, et al), which is detected by a photodetector (e.g. photomultiplier tube, PMT)

Due to the large intensity difference between the strong and weak optical beams, the detected nonlinear optical signal is mainly contributed by the strong optical beam, which is constant with time. Meanwhile, this signal is modulated at frequency f and/or its harmonics due to the interference of these two beams. The amplitude and phase of the electric field of the weak optical beam at the focal point of the strong beam can be estimated by demodulating the detected signal using a lock-in amplifier. By scanning the weak optical beam spatially with respect to the strong optical beam and recording the electric field at a plurality of spatial positions, the profile of the E-field PSF can be re-constructed. This detected E-field PSF is the convolution of the true PSF of the weak optical beam with a δ-like function, where the δ-like function is a multiple order of the strong optical beam PSF (depending on the order of nonlinear interactions) multiplied by the object function (e.g., the distribution of signal source in the focal region). The phase of the Fourier transform of the detected E-field PSF is then added to a wavefront corrector (e.g. spatial light modulator or deformable mirrors). Moreover, the residual aberrations can be eliminated iteratively by repeatedly measuring the E-field PSF and updating the wavefront-shaping element.

In multiphoton microscope, the incident light is normally focused by an objective lens to excite the nonlinear optical signal at the location of interest. The spatial variation of the light intensity in the focal plane is defined as the intensity point-spread function ($I_{PSF}$). In analogy, the complex-valued electric field at the focal plane is regarded as electric field point-spread function ($E_{PSF}$, where $I_{PSF}=|E_{PSF}|^2$), and the nonlinear optical signal is proportional to the multiple orders of the illumination intensity. As for two-photon microscopy, the fluorescence emission is quadratically dependent on the intensity of excitation laser, that is, the fourth power of the amplitude of the electric field ($|E_{PSF}|^4$). The present invention is to obtain the aberrated E-field PSF from the nonlinear optical signals, thereby identifying and optically correcting the wavefront distortions.

In order to obtain the aberrated E-field PSF from the nonlinear optical signals, the system arrangement is based on the basic layout of a regular laser scanning microscope, with several important modifications according to one embodiment of the present invention (FIG. 1). That is, in addition to the scanning beam, a unscanned second optical beam is provided, which is not scanned, but parked within the field-of-view. Then, increasing the intensity of one of the two beams with respect to the other leads the strong beam to become more point-like (due to the nonlinear excitation), and by scanning one beam against the other, i.e. scanning a point-like probe across the weak beam's E-field PSF. More specifically, the method provided in the present invention is to probe the weak aberrated beam with the strong beam, and can be achieved by using either phase modulation or intensity modulation.

The analysis of operation principle takes two-photon excitation as an example and can be easily adapted to other nonlinear microscopies. As for the two-photon microscopy, the fluorescence signal generated by the interference of the scanning and stationary beams at a scanning coordinate x is given by the equation (1):

$$I(x) \propto \int |E_{stat}(x') + E_{scan}(x'-x)|^4 O(x') dx' \quad (1)$$

where $E_{stat}$ and $E_{scan}$ is the complex-valued E-field PSF of the stationary and scanning beam and $O(x')$ is the real-valued object function related to the distribution of fluorophores in the focal plane. To estimate the wavefront distortions, $E_{scan}$ is firstly required to be solved from the equation (1). To achieve this purpose, one of the embodiments of the present invention is to modulate the phase difference of the two beams. The detailed operation principle, optical implementation and experimental results will be shown as follows:

To solve the equation (1), the term $E_{stat}(x')+E_{scan}(x'-x)^4$ is expanded accordingly. For simplicity, it is denoted as $a=E_{stat}(x')$ and $b=E_{scan}(x'-x)$. Then the algebraic expansion formula for $|a+b|^4$, with a and b being complex-valued, is shown in equation (2) as:

$$c=|a+b|^4=|a|^4+2|a|^2ab^*+2|a|^2a^*b+2|b|^2b^*a+ 2|b|^2ba^*+a^2b^{*2}+a^{*2}b^2+4|a|^2|b|^2+|b|^4 \quad (2)$$

If the phase of the scanning beam b is modulated linearly with time, i.e., $b=b_0 e^{j\omega t}$, where $b_0=|b|$, $j=\sqrt{-1}$ and $\omega=2\pi f$ is the modulation frequency. Then the equation (2) becomes as follows:

$$c(t)=|a|^4+2|a|^2 ab_0^* e^{-j\omega t}+2|a|^2 a^* b_0 e^{j\omega t}+2|b_0|^2 ab_0^* e^{-j\omega t}+2|b_0|^2 a^* b_0 e^{j\omega t}+a^2 b_0^{*2} e^{-2j\omega t}+a^{*2} b_0^2 e^{j2\omega t}+4|a|^2|b_0|^2+|b_0|^4 \quad (3)$$

If only the components of frequency ω is considered, then equation (4) is adopted:

$$\{c(t)\}^{(\omega)}=2|a|^2 ab_0^* e^{-j\omega t}+2|a|^2 a^* b_0 e^{j\omega t}+2|b_0|^2 ab_0^* e^{-j\omega t}+2|b_0|^2 a^* b_0 e^{j\omega t} \quad (4)$$

Assuming $|a|^2 \gg |b_0|^2$, the last two items of the equation (4) can be ignored to obtain equation (5):

$$\{c(t)\}^{(\omega)}=2|a|^2 ab_0^* e^{-j\omega t}+2|a|^2 a^* b_0 e^{j\omega t} \quad (5)$$

Setting the ratio between the two beams such that $|E_{scan}|$ is much smaller than $|E_{stat}|$ (e.g., $|E_{scan}|^2/|E_{stat}|^2 < 0.1$), the equation (1) with components of frequency ω reads, $$\{I(x)\}^{(\omega)} \propto \int (2|a|^2 ab_0^* e^{-j\omega t}+2|a|^2 a^* b_0 e^{j\omega t}) O(x') dx' \quad (6)$$

This signal I(x) is then demodulated by performing a lock-in amplifier measurement at frequency a. The two orthogonal outputs X (i.e., in-phase) and Y (i.e., quadrature) of the lock-in amplifier are:

$$X=\int I(t)\cos \omega t \, dt = \int 2|a|^2 (ab_0^*+a^*b_0) O(x') dx' \quad (7)$$

$$Y=\int I(t)\sin \omega t \, dt = \int 2|a|^2 j(-ab_0^*+a^*b_0) O(x') dx'$$

Therefore, the $|a|^2 ab_0^*$ can be solved as $$E_f(x) = X + jY = \int 4|a|^2 ab_0^* O(x') dx' \propto \int \underbrace{|E_{stat}(x')|^2 E_{stat}(x') O(x')}_{\delta-\text{like function}} \cdot E_{scan}^*(x'-x) dx' \quad (8)$$

Considering the E-field PSF as an aberrated focus including a strong center and weak side lobes, the cubic term $|E_{stat}(x')|^2 E_{stat}(x') O(x')$ can be regarded as a highly peaked, δ-like function. The measured signal $E_f(x)$ is thereby a convolution of the aberrated E-field PSF $E_{scan}^*$ with the δ-like function. Therefore, $E_f(x)$ can be used to approximate the true E-field PSF of the imaging system. Knowing the aberrated E-field PSF, the time reversal symmetry of optical propagation can be applied to correct for optical aberrations by phase conjugation. The desired correction pattern for the wavefront-shaping element is the two-dimensional Fourier transform of the measured E-field PSF showing in the equation (9).

$$\mathcal{F}\{E_f(x)\}=\mathcal{F}\{|E_{stat}(x)|^2 E_{stat}(x) O(x)\} \cdot \mathcal{F}\{E_{scan}(x)\}^* \quad (9)$$

The convolution kernel $|E_{stat}(x')|^2 E_{stat}(x') O(x')$ in the aforementioned analysis is not exactly a S function, therefore, the estimated E-field PSF will approximate, but not perfectly stand for the true E-field PSF. However, after applying the Fourier transform of the estimated E-field PSF on the wavefront shaper, the updated beam will nevertheless be closer to a diffraction-limited spot, which in turn means that the third power of its amplitude will more closely resemble a S function. Repeating the E-field PSF measurement process will obtain more accurate E-field PSF in each correction step, thereby eliminating residual aberrations in an iterative manner. It shows that the amplitude of the corrected E-field PSF will be taken to the third power after each correction step. Consecutive cubing of the corrected E-field PSF amplitude will finally turn any speckle pattern into a sharply peaked focus in a finite number of steps.

After 1st correction shown below, the electric field distribution at the focal plane will be, $$E_{1st\, corr}(x) = \quad (10)$$

$$\mathcal{F}^{-1}\left\{\underbrace{\mathcal{F}\{|E_{stat}(x)|^2 E_{stat}(x) O(x)\} \cdot \mathcal{F}\{E_{scan}(x)\}^*}_{\text{1st corr wavefront}} \cdot \underbrace{\mathcal{F}\{E_{PSF}(x)\}}_{\text{aberration}}\right\}$$

Because the $E_{stat}$ and $E_{scan}$ is equal to the E-field PSF $E_{PSF}(x)$ within a small lateral range defined by the the memory effect and the time reversal property of light propagation implies that $\mathcal{F}\{E_{scan}\}^* \cdot \mathcal{F}\{E_{PSF}(x)\}=1$, and the corrected E-field PSF in the 1st iteration is equal to, $$E_{1st\, corr}(x) = \mathcal{F}^{-1}\{\mathcal{F}\{|E_{stat}(x)|^2 E_{stat}(x) O(x)\}\} = |E_{stat}(x)|^2 \quad (11)$$

$$E_{stat}(x) O(x) = |E_{stat}(x)|^3$$

$$O(x) e^{j\varphi_{stat}(x)} = |E_{PSF}(x)|^3 O(x) e^{j\varphi_{PSF}(x)}$$

Next, repeat this process and scan the corrected scanning beam ($E_{1st\, corr}$) against the corrected stationary beam ($E_{1st\, corr}$), and insert $E_{1st\, corr}$ into the equation (1) to redefine $E_{scan}$ and $E_{stat}$. Follow exactly the same analysis and update the 2nd corrective wavefront to the wavefront-shaping element and the corrected PSF in the 2nd iteration will be, $$E_{2nd\, corr}(x) = \mathcal{F}^{-1}\left\{\underbrace{\{\mathcal{F}|E_{1st\, corr}(x)|^2 E_{1st\, corr}(x) O(x)\} \cdot \mathcal{F}\{E_{1st\, corr}(x)\}^*}_{\text{2nd corr wavefront}} \cdot \underbrace{\mathcal{F}\{E_{1st\, corr}(x)\}}_{\text{residual wavefront}}\right\} = \quad (12)$$

$$|E_{1st\, corr}(x)|^3 O(x) e^{j\varphi_{stat}(x)} = (|E_{PSF}(x)|^3 O(x))^3 O(x) e^{j\varphi_{PSF}(x)}$$

It is shown that by iteratively probing the E-field PSF and correcting the excitation beam, $E_{corr}$ will converge towards its 3rd power. Applying this nonlinear factor on any aberrated focus will help any dominant mode to prevail against other weaker side lobes and finally result in a near-diffraction-limited E-field PSF. In sum, the amplitude of $E_{corr}$ will be taken to the power of three in each correction step for two-photon excitation and will converge faster if higher order of nonlinear process is adopted. For example, in the case of three-photon excitation, the convergence rate will be proportional to the 5th power.

It is clear from aforementioned analysis that the number of correction steps required to converge towards a diffraction-limited E-field PSF will strongly depend on the original shape of the scattered E-field PSF. The presence of a dominant mode will allow us to converge faster, compared to a case when multiple modes have comparable intensities. Moreover, as can be seen from the equation (11) and equation (12), if the sample under the optical microscopy is sparse and includes tiny point-like fluorescent structures (i.e. O(x) is a δ-like function), the convergence rate will be faster than that of the uniform fluorescence case (i.e. O(x) is a uniform function).

Figure 2A:
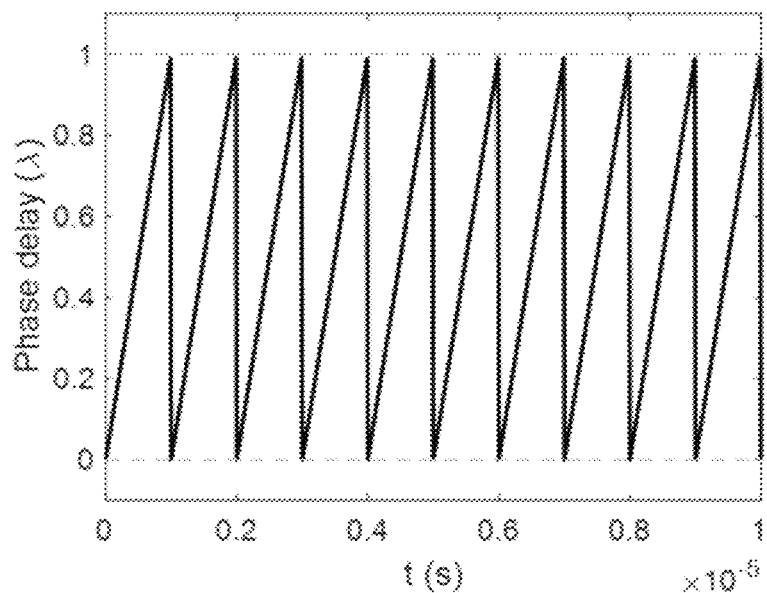
FIG. 2A illustrates a phase modulation as a function versus time by the phase modulator according to an embodiment of the present invention.

FIG. 1 illustrates the first type arrangement for the phase modulation method according to one embodiment of the present invention so as to identify and correct for optical aberrations as well as biological imaging. The system comprises an interferometer arrangement that has an input beam splitter (BS1), which separates an incoming laser beam (e.g. from a femtosecond laser) into a first and a second optical beam. The input beam splitter (BS1) may include, for example, but is not limited to a polarization beam splitter, a non-polarizing beam splitter, other beam splitting devices, or any combination thereof. The first interferometer branch includes a phase modulator (PMOD) and a beam scanner (GM1). The phase modulator may include, for example, but is not limited to a piezo scanner, an acousto-optic modulator, an electro-optic modulator, or any combination thereof that can provide linear modulation of the phase delay of the first optical beam with respect to the second optical beam from the full range of $-\pi$ to $\pi$ as shown in FIG. 2A. The phase modulator may also be driven by a function generator (FGC).

Figure 2B:
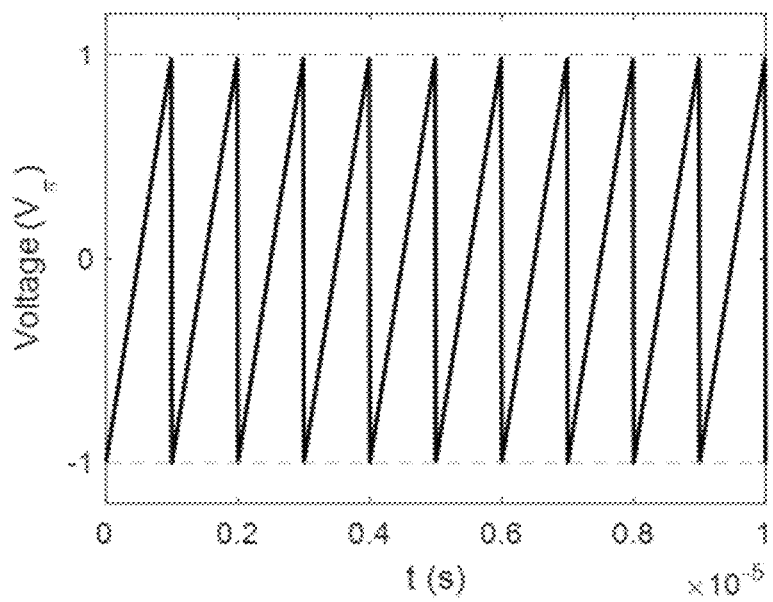
FIG. 2B illustrates how driving voltage signal is applied to the phase modulator according to one embodiment of the present invention.

Referring to FIG. 2B, it showed the desired modulation is achieved by the driving signal for the phase modulator. The beam scanner may include, for example, but is not limited to galvo scanning mirrors, resonant scanning mirrors, acousto-optic deflectors (AOD), other Micro Electromechanical System (MEMS) mirrors or any combination thereof that can provide two-axis scanning of the excitation beam. The first or second interferometer branch includes an optical delay line (not shown in FIG. 1) to ensure that the two beams are overlapped in time after combination such that interference can occur. The two beams are then combined by using another beam splitter (BS2), including for example, but not limited to a polarization beam splitter, a non-polarizing beam splitter, or any combination thereof. The combined optical beam may pass through a linear polarizer (P) to ensure that the polarization direction satisfies the requirement of the wavefront corrector (WFC). The wavefront corrector can modify the received excitation light before directing it to the laser scanning microscope. The laser scanning microscope is arranged according to a standard configuration, which comprises a pair of scanners (GMx and GMy) for scanning the excitation beam in the X-Y direction, followed by the objective lens (OL) for focusing light into sample and one or more detectors such as photomultiplier tube (PMT) for detecting the nonlinear optical signals generated by the interaction of excitation laser with the sample.

The output current of the detector is converted to voltage by a current amplifier (Amp) and the signal is then fed into a lock-in amplifier to extract the amplitude and phase of the excited optical signal at the modulation frequency or its harmonics. The synchronization signal from the function generator is used as the reference signal for lock-in detection. The output signals of the lock-in amplifier are digitized by a data acquisition device (DAQ) and are further processed in a computer. In one embodiment of the present invention, the system is configured in such a way that the first optical beam has much lower intensity than the second optical beam (e.g., 1:10). Therefore, the second optical beam may be regarded as a δ-like function and can be used to probe the E-field PSF of the first optical beam. More specifically, in the aberrations identification process, the paired scanner GMx and GMy are fixed to a specific position such that the second optical beam parks at a fixed region to generate nonlinear optical signal. Then the scanner (GM1) in the first interferometer branch is scanned over a small field of view such that the first optical beam can be spatially displaced with respect to the second optical beam for a plurality of positions. A set of measurement of the output signals of the lock-in amplifier is carried out during the scanning of the first optical beam and is further processed in the computer to derive the E-field PSF of the first optical beam.

A first arrangement includes a wavefront corrector to compensate for the aberration of both two beams. In the aberrations correction process, a phase pattern derived from the Fourier transform of the identified complex-valued E-field PSF is updated on the wavefront corrector to correct the aberrations. The wavefront correction device may include, for example, but is not limited to a liquid crystal spatial light modulator, a digital micro mirror device, a deformable mirror or any combination thereof.

In one embodiment, the wavefront correction device can be placed at the second interferometer branch to correct the strong beam only, similar to an open loop configuration.

In another embodiment, the wavefront correction device may be placed at the plane conjugated to the objective pupil and/or any turbid layer inside or above the sample.

For the sample-conjugated wavefront correction, a tunable liquid lens can be placed on the objective pupil-conjugated plane to adjust the focal plane of the microscope system while keeping the conjugation of the wavefront correction device with the turbid layer. In addition, the aberrations of the imaging instrument can be corrected with a pupil-conjugated wavefront correction device by using a pre-calibrated lookup table that record the system aberrations at each focal plane.

The measurement for identifying and correcting aberration may be performed several times by iteratively measuring the complex-valued E-field PSF and updating the correction pattern to further eliminate the residual aberrations. According to the aforementioned description, the convergence rate is proportional to the $3^{rd}$ power of the previous correction step for two-photon excitation. Preferably, three iterations have been performed to compensate for the optical aberrations induced by biological samples according to one embodiment of the present invention.

Figure 3:
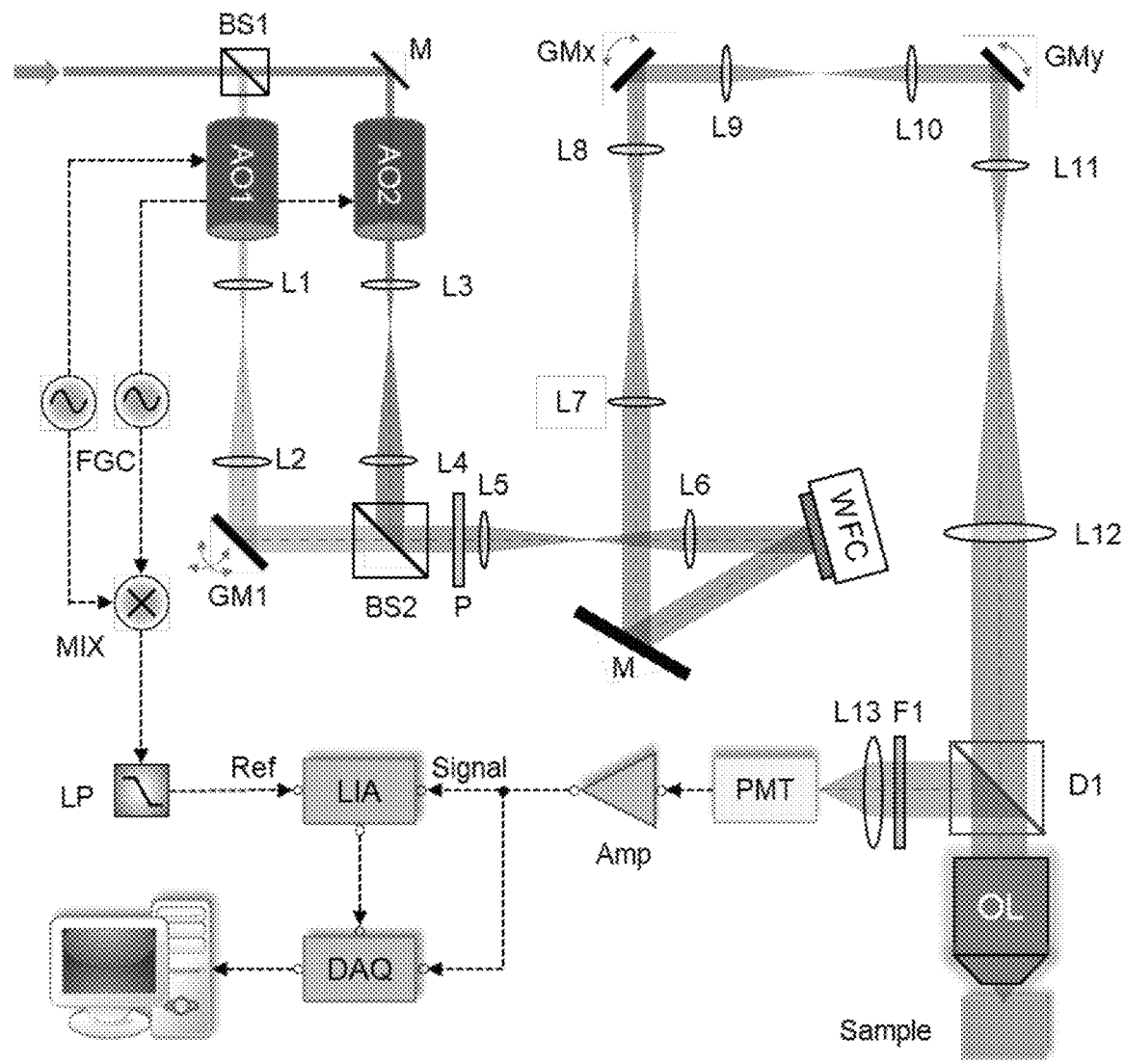
FIG. 3 is a schematic diagram of the present system in view of an acoustic optics effect according to one embodiment of the present invention.

A second arrangement for the phase modulation method according to one embodiment of the present invention aims to slightly shift the frequency of one or both optical beams by using acoustic optical effect. The linear phase modulation of an optical beam from $-\pi$ to $\pi$ is equivalent to the frequency shift of the optical wave, therefore, an optical frequency shifter is used to provide accurate phase modulation. The optical frequency shift can be generated by using the $1^{st}$ diffraction order of the acoustic optical modulator (AOM) or acoustic optical frequency shifter (AOFS). However, because the diffraction efficiency of acoustic optical effect is low for small frequency shift (f<20 MHz), two AOFSs with acoustic frequency of $f_o+f/2$ and $f_o-f/2$ are applied in the arrangement, where $f_o$ is the center frequency designed for the AOFS and f is the frequency of modulation. For example, in order to generate a 10 MHz phase modulation, two AOFSs with frequencies of 75 MHz and 85 MHz are applied, respectively. The two AOFSs can be both placed at the same interferometer branch or one AOFS at each branch according to one embodiment of the second type arrangement for the phase modulation in the present invention (AO1 and AO2 shown in FIG. 3). Here, the reference signal for the lock-in amplifier is the difference frequency of the two driving frequencies for the two AOFSs.

Figure 4:
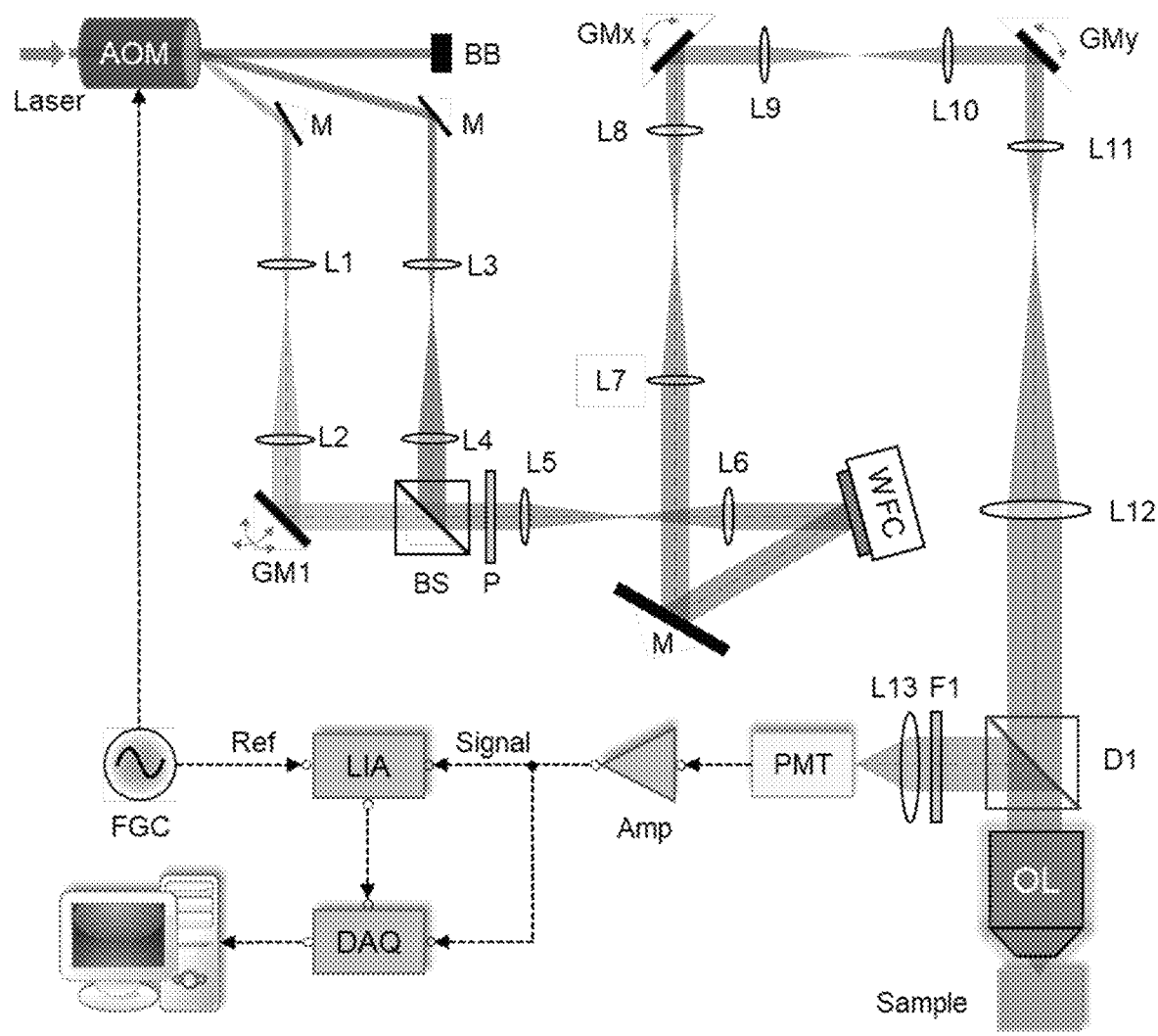
FIG. 4 is a schematic diagram of the present system with a single acoustic optical modulator according to one embodiment of the present invention.

In addition, one single AOM is also sufficient to generate two diffraction beams with a slight frequency difference according to another embodiment of the second type arrangement for the phase modulation in the present invention. For example, if the AOM is modulated with a cosine function with frequency f i.e. f(t)=cos(2πf), the acoustic wave to drive the AOM will be $$f_{acoustic}(t)=\cos(2\pi f)\cos(2\pi f_o)=\frac{1}{2}\cos(2\pi(f_o-f))+\frac{1}{2}\cos(2\pi(f_o+f)) \quad (13)$$

where $f_o$ is the center frequency of AOM. This will generate two acoustic wave with frequency $f_o-f$ and $f_o+f$, so the $1^{st}$ diffraction order of the AOM will have two output beams corresponding to these two frequencies and the frequency difference of these two beams is 2f. Referring to FIG. 4, the AOM is regarded as a phase modulator as well as a beam splitter. The reference signal for the lock-in amplifier is the second harmonic frequency of the voltage signal applied to the AOM driver. In addition, the excitation laser for non-linear optical microscopy is normally a periodic ultrashort pulse beam, which is benefit to relax the requirement for the phase modulation or frequency shift. For example, if the repetition rate of the light source is $f_l$, a desired phase modulation of frequency f can be generated by shifting the optical wave frequency by $f_l+f$ or $f_l-f$. Considering the optical beam with optical wave frequency $f_o$, after inducing a frequency shift of $f_l+f$ the wave function becomes $$E(t) = E_0 e^{j[2\pi(f_o+f+f_l)]} \cdot \sum_{i=-\infty}^{+\infty} \delta\left(t-\frac{i}{f_l}\right) = \quad (14)$$

$$E_0 e^{j[2\pi(f_o+f)t]} \cdot \sum_{i=-\infty}^{+\infty} \delta\left(t-\frac{i}{f_l}\right) \cdot e^{j[2\pi(f_l t)]} =$$

$$E_0 e^{j[2\pi(f_o+f)t]} \cdot \sum_{i=-\infty}^{+\infty} \delta\left(t-\frac{i}{f_l}\right)$$

Figure 5:
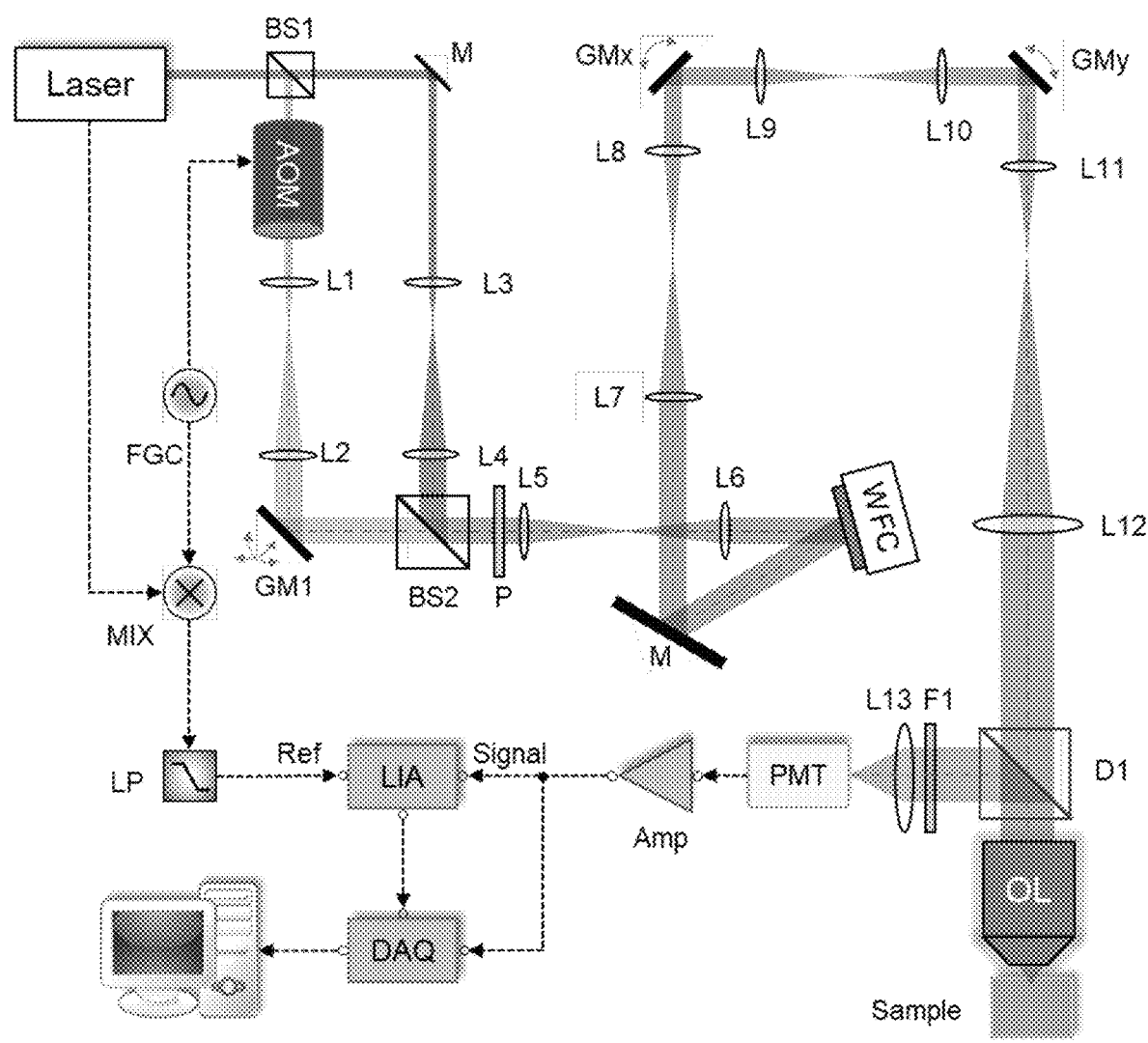
FIG. 5 is a schematic diagram of the present system with a single acoustic optical modulator according to another embodiment of the present invention.
Figure 6:
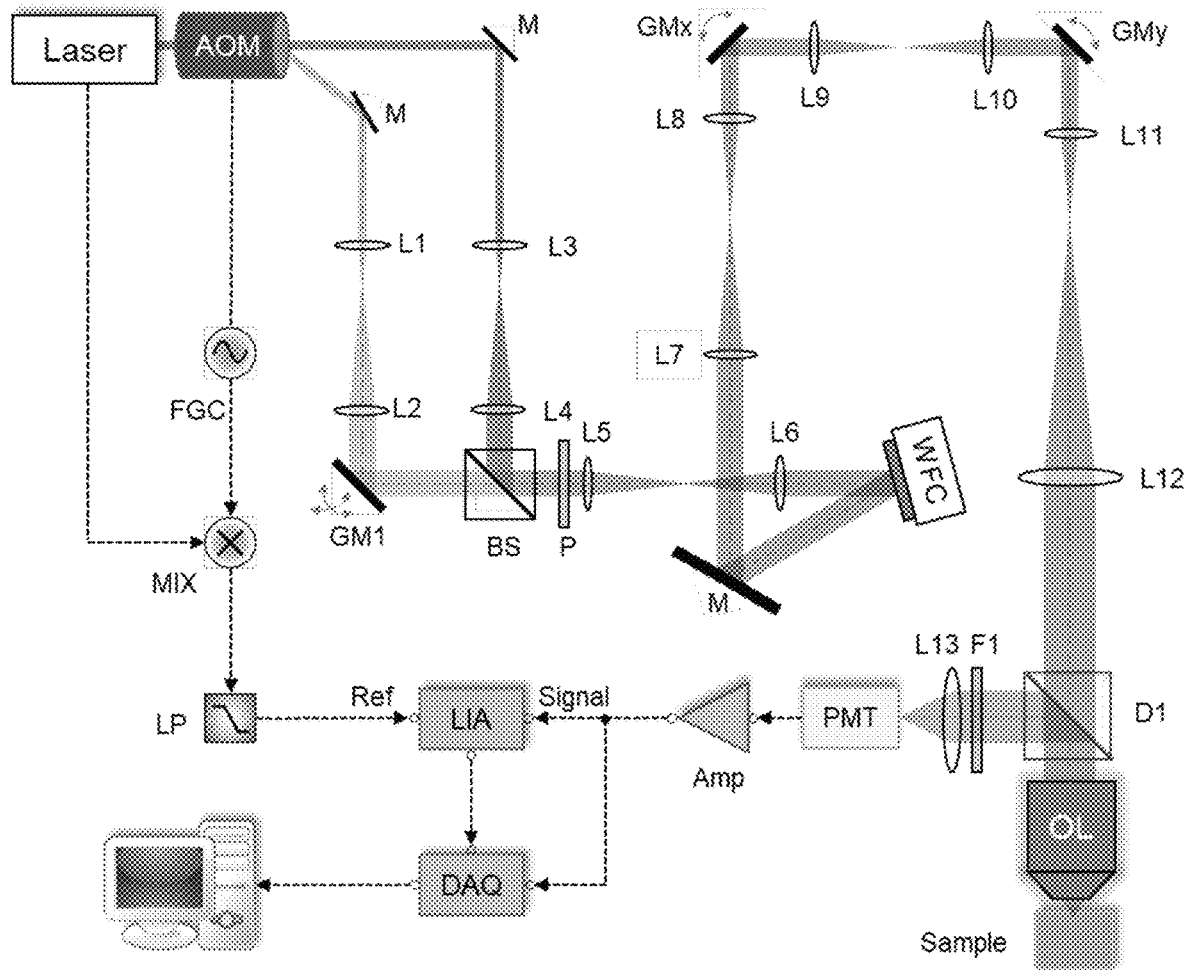
FIG. 6 is a schematic diagram of the present system with a single acoustic optical modulator according to a further embodiment of the present invention.

This is equivalent to the linear phase modulation of frequency f. This phenomenon is similar to the aliasing effect in the sampling process when a high-frequency signal is sampled with a low sampling rate. In general, $f_l$ is approximately 80 MHz for the commonly used two-photon excitation laser and a commercially available 70 or 90 MHz AOM or AOFS can be used to generate a 10 MHz phase modulation. Referring to FIG. 5 and FIG. 6, it illustrates the optical system by using this approach according to other embodiments of the second arrangement for the phase modulation in the present invention. Here, the reference signal for the lock-in amplifier is the difference frequency of the laser pulse synchronization frequency and acoustic frequency of the AOM or AOFS.

Example 1

Figure 7A:
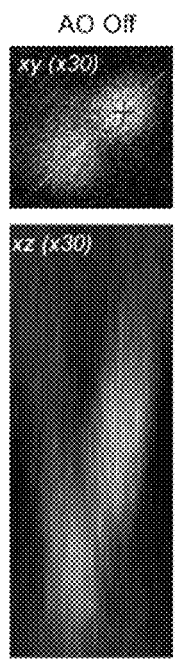
FIG. 7A shows a two-photon fluorescence image of a 2-μm-diameter fluorescent bead positioned 300 μm under a 50-μm-thickness skull without adaptive optics (AO) correction according to one embodiment of the present invention.
Figure 7B:
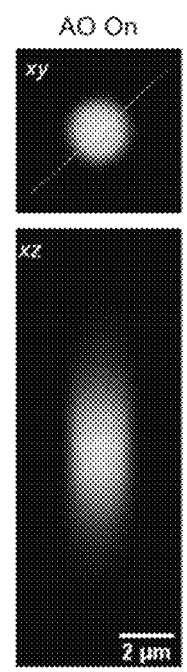
FIG. 7B shows the two-photon fluorescence image of a 2-μm-diameter fluorescent bead positioned 300 μm under a 50-μm-thickness skull with AO correction as a comparison to the embodiment as shown in FIG. 7A.
Figure 7C:
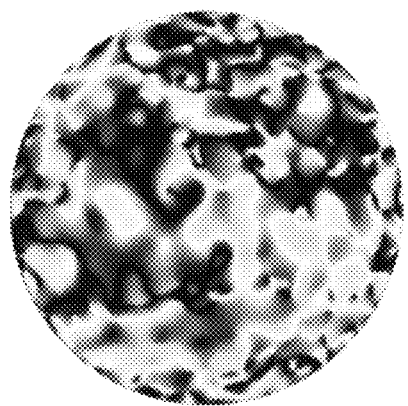
FIG. 7C shows the optical aberration identified after three iterations by the method according to one embodiment of the present invention.
Figure 7D:
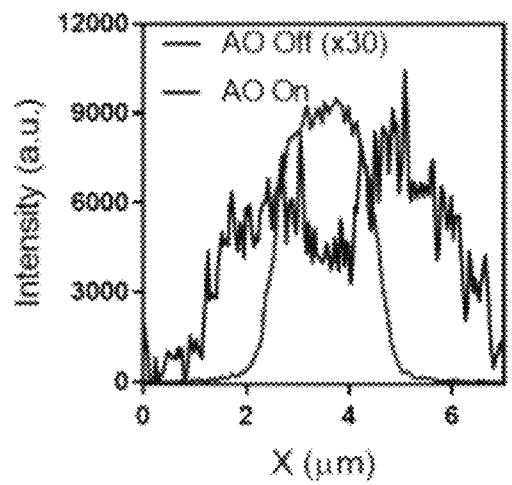
FIG. 7D illustrates the intensity profile along the dashed line in FIG. 7A and FIG. 7B.

A feasibility study to image the fluorescent beads through a thinned mouse skull is performed to evaluate the efficacy based on the arrangement for the phase modulation method according to one embodiment of the present invention. Here, the 50-μm-thickness skull was used as the aberration source and 2-μm-diameter fluorescent beads were used to evaluate the performance of AO correction. The arrangement of the optical system is shown in FIG. 4 and the driving signal for AOM (center frequency $f_o=80$ MHz) is modulated by a cosine signal of frequency f=10 MHz, which results in two $1^{st}$ order diffraction beams with frequency shift of 70 MHz and 90 MHz respectively (equation (13)). The imaging results are shown in FIG. 7A to 7D. Without AO correction, the fluorescence image was severely blurred by the optical aberrations induced by the skull as shown in FIG. 7A. In order to measure the wavefront distortions, the strong beam at the brightest region has been parked as indicated by the cross in FIG. 7A and then scan the weak beam in a small field of view of 20×20 μm² to capture the complex E-field PSF by using the method described above. Referring to FIG. 7B, the diffraction-limited resolution has been recovered after three iterations. The corrective wavefront applied to the wavefront correction device is displayed in FIG. 7C. These results demonstrate that the method for identifying and correcting optical aberrations in the present invention can effectively correct the aberrations and improve the fluorescence intensity by more than 30 folds (FIG. 7D).

Example 2

Moreover, an in vivo two-photon imaging of cortical neurons and dendritic spine structures in a Thy1-GFP mouse through a thinned skull window of approximately 50-μm thickness has been conducted to illustrate the potential applications of the present invention for high-resolution biological imaging. The results are shown in FIG. 7E to 7H. As shown in FIG. 7E, the GFP labelled dendrites at 200 μm below the skull were significantly distorted and the spines were invisible without AO correction. After AO correction, the spines can be clearly resolved as indicated by the arrow heads in FIG. 7F and the two-photon excited fluorescence signal is also increased tremendously. These results show the method in the present invention can be used to improve the performance of brain imaging and facilitate neuroscience research in living animals.

In addition to phase modulation, another method has been developed by modulating the intensity of the excitation beam and deriving $E_{scan}$ with a two-phase scheme. Basing on the equation (2), if the intensity of the scanning beam b has been modulated in such a way that $b=b_0 \cos wt$, where $\omega=2\pi f$ is the modulation frequency. Then the equation (2) becomes $$c=|a+b|^4=|a|^4+2|a|^2 ab_0 * \cos wt+2|a|^2 a*b_0 \cos wt+2|b_0|^2 b_0 * (\cos wt)^3 a+2|b_0|^2 b_0(\cos wt)^3 a*+ a^2 b_0 *^2 (\cos wt)^2+a*^2 b_0^2 (\cos wt)^2+4|a|^2 |b_0|^2 (\cos wt)^2+|b|^4 (\cos wt)^4 \quad (15)$$

The component of frequency ω is, $$\{c(t)\}^{(\omega)}=2|a|^2 ab_0 * \cos wt+2|a|^2 a*b_0 \cos wt+2|b_0|^2 b_0 * (\cos wt)^3 a+2|b_0|^2 b_0(\cos wt)^3 a* \quad (16)$$

Assume $|a|^2 >> |b_0|^2$, the last two items can be ignored and get $$\{c(t)\}^{(\omega)}=2|a|^2 ab_0 * \cos wt+2|a|^2 a*b_0 \cos wt \quad (17)$$

Setting the ratio between the two beams such that $|E_{scan}|$ is much smaller than $|E_{stat}|$ (i.e., $|E_{scan}|^2/|E_{stat}|^2<0.1$), the equation (1) with component of frequency ω reads, $$\{I(x)\}^{(\omega)} \propto \int (2|a|^2 ab_0 * \cos wt+2|a|^2 a*b_0 \cos wt)O(x') dx' \quad (18)$$

Next, the signal I(x) is demodulated using a lock-in amplifier at frequency ω, the R (i.e. magnitude) output of the lock-in amplifier is recorded as, $$R=\int I(t)\cos wt\, dt=\int |a|^2(ab_0*+a*b_0)O(x')dx' \quad (19)$$

If the phase difference between two beams has been changed to 0 and $\pi/2$ (i.e. $b_{\pi/2}=b_0 e^{j\pi/2}$) respectively, then $$R_0 = \int |a|^2 (ab_0^* + a^*b_0)O(x')dx' \quad (20)$$

$$R_{\frac{\pi}{2}} = \int |a|^2 (-ab_0^* j + a^*b_0 j)O(x')dx'$$

And $|a|^2 ab_0^*$ can be isolated as $$E_f(x) = R_0 + j \cdot R_{\frac{\pi}{2}} = 2\int |a|^2 ab_0^* O(x')dx' \propto \quad (21)$$

$$\int \underbrace{|E_{stat}(x')|^2 E_{stat}(x')O(x')}_{\delta-\text{like function}} \cdot E_{scan}^*(x'-x)dx'$$

Similarly, the correction pattern here is the Fourier transformation of $E_f(x)$ and the convergence rate is the same as the aforementioned phase modulation method disclosed in the present invention. Although the analysis is based on a cosine modulation, other modulation functions such as on-off modulation are also applicable.

Figure 8:
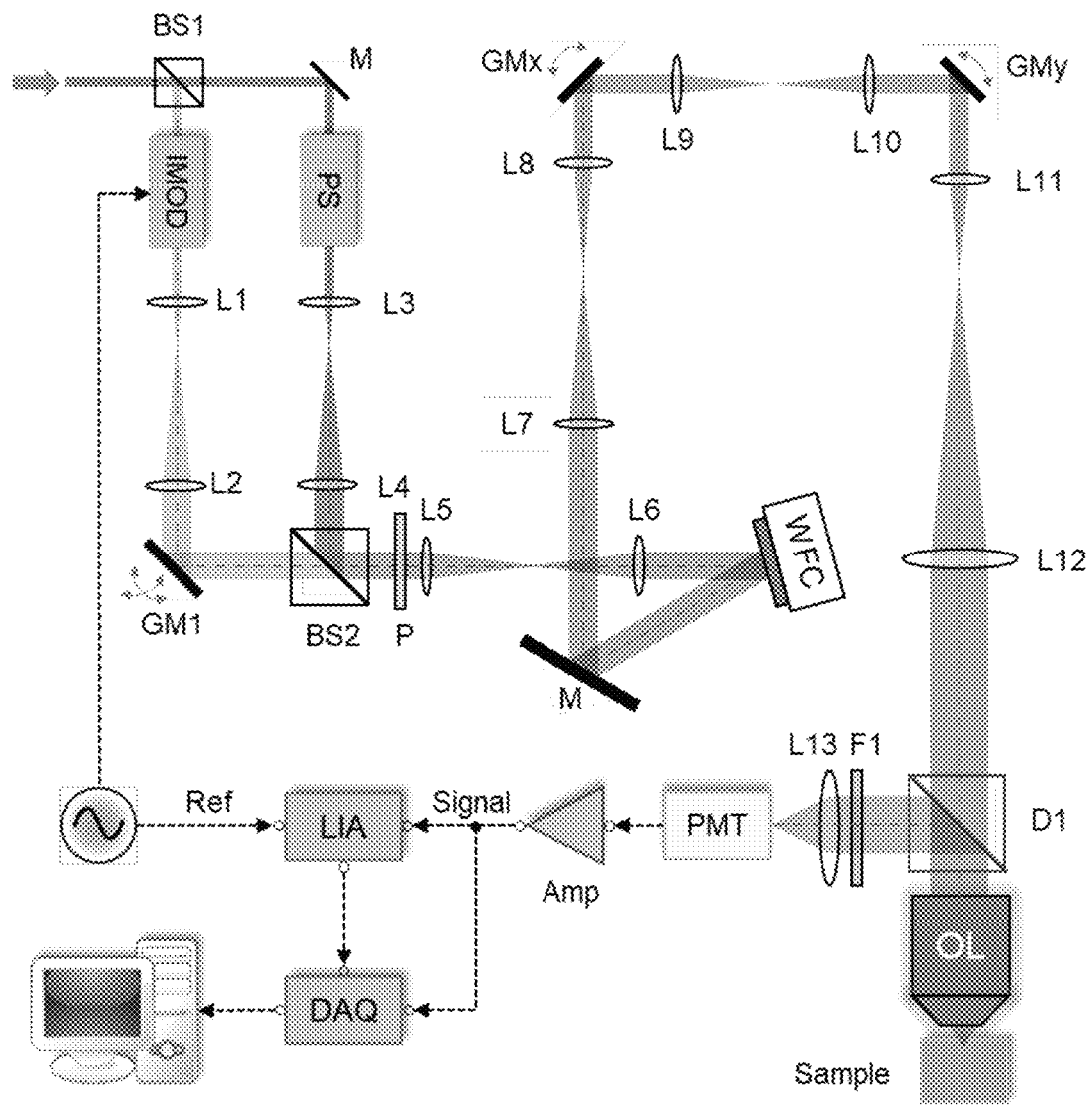
FIG. 8 is a schematic diagram of the system with intensity modulation according to one embodiment of the present invention.

Referring to FIG. 8, it illustrates the arrangement for the intensity modulation approach according to one embodiment of the present invention. The intensity of the first optical beam of the interferometer is modulated by an intensity modulator (IMOD), including for example, but not limited to acoustic optical modulator (AOM), electro optical intensity modulator (EOM), photoelastic modulator (PEM), optical chopper, or any combination thereof. The modulation signal can also be an on-off square wave or cosine wave function. The second interferometer branch includes a phase stepper (PS) to induce a 0 or $\pi/2$ phase delay by using a piezo stage or an electro-optical phase modulator. In general, the phase stepper may be configured in the first branch or outside the interferometer. Two measurements of the corresponding magnitude output of the lock-in amplifier are recorded for each spatial displacement of the first optical beam with respect to the second optical beam to obtain $R_0$ and $R_{\pi/2}$. Then the complex-valued E-field PSF is derived by the equation (21). The procedure of aberration identification and correction is identical to the phase modulation approach described above.

Example 3

Figure 9A:
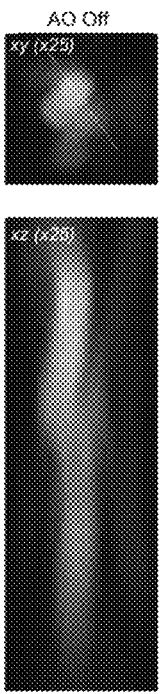
FIG. 9A shows the two-photon fluorescence image of a 2-μm-diameter fluorescent bead positioned 400 μm under a 50-μm-thickness skull without AO correction.
Figure 9B:
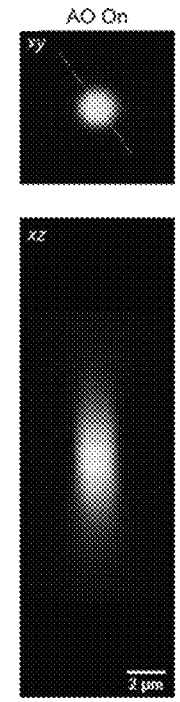
FIG. 9B shows the two-photon fluorescence image of a 2-μm-diameter fluorescent bead positioned 400 μm under a 50-μm-thickness skull with AO correction.
Figure 9C:
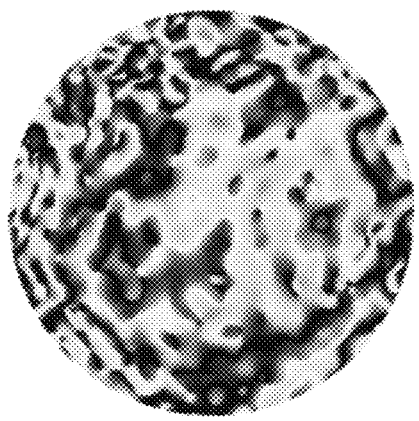
FIG. 9C shows the optical aberration identified after three iterations by the method according to one embodiment of the present invention.
Figure 9D:
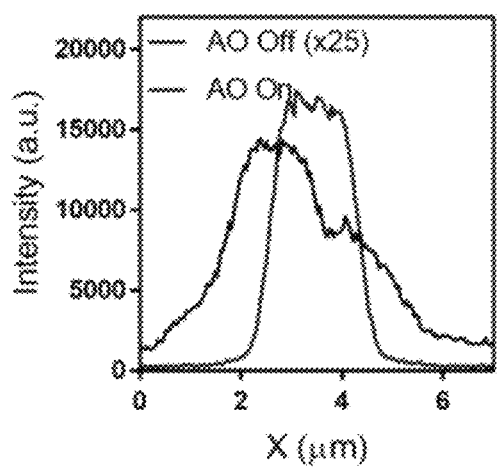
FIG. 9D illustrates the intensity profile along the dashed line in FIG. 9A and FIG. 9B.

A performance evaluation is conducted to evaluate the efficacy based on the arrangement for the intensity modulation method according to one embodiment of the present invention. Here, the 50-μm-thickness skull was used as the aberration source and 2-μm-diameter fluorescent beads were used to evaluate the performance of AO correction. The arrangement of the optical system is shown in FIG. 8, where a photoelastic modulator is configured to modulate the intensity of the weak beam and a MEMS mirror is used to alter the phase difference of the two beams. The imaging results are shown in FIGS. 9A to 9D. The fluorescence image was severely blurred by the optical aberrations induced by the skull without AO correction shown in FIG. 9A. Referring to FIG. 9B, the diffraction-limited resolution has been recovered by the identifying and correcting aberration methods after three iterations. The corrective wavefront applied to the wavefront correction device is displayed in FIG. 9C. The fluorescence intensity is improved by more than 25 folds shown in FIG. 9D. Similar to the phase modulation scheme, intensity modulation method in the present invention can also efficiently measure and correct the wavefront distortions and recover diffraction-limited imaging performance.

In summary, the present invention can be easily integrated into a standard multiphoton microscope for in vivo biological imaging. The performance of the present method is evidenced by both the in vitro and in vivo sample analyses and the results demonstrate that the present invention can effectively compensate for the aberrations and restore near-diffraction-limited imaging resolution.

The foregoing description of the present invention has been provided for the purposes of illustration and description. It is not intended to be exhaustive or to limit the invention to the precise forms disclosed. Many modifications and variations will be apparent to the practitioner skilled in the art.

The invention claimed is:

1. A method for identifying and correcting optical aberrations within a sample under optical microscopy, comprising:
   providing a plurality of optical beams including at least a first optical beam and a second optical beam;
   modulating at least one of the optical beams at one or more frequencies, the intensity of one of the optical beams being higher than the other;
   the first optical beam and the second optical beam being at least partially superimposed in time to provide a combined optical beam;
   focusing the combined optical beam into an imaging sample, followed by detecting a first signal excited by the combined optical beam in the sample;
   demodulating the first signal by at least one lock-in amplifier to obtain a second signal comprising performing a plurality of measurements of the spatial positions of the first optical beam with respect to the second optical beam; and
   obtaining an electric-field point spread function of the optical beams based on the second signal to identify and correct the optical aberrations within the sample.

2. The method of claim 1, wherein the modulating is selected from phase modulation, intensity modulation, or a combination thereof.

3. The method of claim 2, wherein the phase modulation comprises performing at least one measurement for each spatial position of the first optical beam with respect to the second optical beam.

4. The method of claim 2, wherein the intensity modulation comprises performing at least two measurements for each spatial position of the first optical beam with respect to the second optical beam, and wherein a relative phase between the first and the second optical beam is altered between the two measurements.

5. The method of claim 1, wherein the identified optical aberrations are for correcting wavefront of the optical beams.

6. The method of claim 1, wherein the reference frequency of the lock-in amplifier is selected from modulation frequency, harmonic frequency, or a combination thereof.

7. The method of claim 1, wherein one of the optical beams is for imaging a sample while the other optical beams are hindered.

8. The method of claim 1, further comprising repeating said demodulating and said reconstructing until an accurate estimation of the optical aberration is obtained.

9. The method of claim 1, wherein more than one optical beams are modulated by modulation selected from phase modulation, intensity modulation, or a combination thereof at one or more frequencies to generate a plurality of signals, and wherein more than one lock-in amplifiers are configured to demodulate the signals.

10. An optical system for identifying and correcting optical aberrations within a sample under optical microscopy by phase modulation, comprising:
   at least one optical beam generating device configured to provide a plurality of optical beams including at least a first optical beam and a second optical beam, wherein the intensity of one of the optical beams is higher than the other;
   at least one optical phase modulator configured to perform the phase modulation of at least one of the optical beams;
   at least one optical beam scanning device configured to provide a spatial displacement of the first optical beam with respect to the second optical beam;
   at least one optical beam combination device configured to superimpose the first optical beam and the second optical beam to obtain a combined optical beam such that the first and second optical beams are at least partially overlapped in time;
   at least one wavefront correction device configured to modify the wavefront of at least one of the optical beams;
   at least one focusing device configured to focus the combined optical beam into an imaging sample, a first signal is excited from the imaging sample by the combined optical beam, wherein a detection device is configured to detect the first signal;
   at least one lock-in amplifier configured to demodulate the first signal to obtain a second signal;
   wherein the electric-field point spread function of the optical beams is obtained from the second signal so as to identify and correct the optical aberrations within the sample.

11. The optical system of claim 10, wherein the optical beam generating device comprises a light source and a beam splitting device; wherein the light source is configured to generate the optical beams; wherein the beam splitting device is configured to split the optical beams into the first optical beam and the second optical beams; wherein the splitting device is selected from a polarized beam splitter, non-polarized beam splitter, acoustic optical modulator, or any combination thereof.

12. The optical system of claim 10, wherein the phase modulation is a linear function in time over the full phase ranging from $-\pi$ to $\pi$; wherein the phase modulation is performed by selecting from altering the optical path length, shifting the optical frequency of at least one of the optical beams or any combination thereof, wherein the altering the optical path length is performed by selecting from electro-optical phase modulator, piezo stage or any combination thereof, wherein the shifting the optical frequency is performed by selecting from acoustic optical modulator, acoustic optical frequency shifter or any combination thereof.

13. The optical system of claim 10, further comprising an optical path adjusting device configured to vary the optical path of one of the two optical beams such that the two optical beams are superimposed in time.

14. The optical system of claim 10, wherein the wavefront correction device is selected from liquid crystal light spatial modulator, deformable mirror, digital micromirror device, or any combination thereof.

15. The optical system of claim 10, further comprising a device configured to generate a reference signal to the lock-in amplifier.

16. The optical system of claim 10, wherein the second signal comprises in-phase and quadrature outputs from the lock-in amplifier, which are measured for a plurality of spatial positions of the first optical beam with respect to the second optical beam.

17. An optical system for identifying and correcting optical aberrations within a sample under optical microscopy by intensity modulation, comprising:
   at least one optical beam generating device configured to provide a plurality of optical beams including at least a first optical beam and a second optical beam, wherein the intensity of one of the optical beams is higher than the other;
   at least one optical intensity modulator configured to perform the intensity modulation of at least one of the optical beams;
   at least one phase shifting device configured to perform the phase shift of at least one of the optical beams;
   at least one optical beam scanning device configured to provide a spatial displacement of the first optical beam with respect to the second optical beam;
   at least one optical beam combination device configured to superimpose the first optical beam and the second optical beam to obtain a combined optical beam such that the first and second optical beams are at least partially overlapped in time;
   at least one wavefront correction device configured to modify the wavefront of at least one of the optical beams;
   at least one focusing device configured to focus the combined optical beam into an imaging sample, a first signal is excited from the imaging sample by the combined optical beam, wherein a detection device is configured to detect the first signal;
   at least one lock-in amplifier configured to demodulate the first signal to obtain a second signal;
   wherein the electric-field point spread function of the optical beams is obtained from the second signal so as to identify and correct the optical aberrations within the sample.

18. The optical system of claim 17, wherein the optical intensity modulator is selected from electro optical intensity modulator, acoustic optical modulator, photoelastic modulator, optical chopper, or any combination thereof.

19. The optical system of claim 17, wherein the phase shifting device is selected from electro-optical phase modulator, piezo stage, MEMS mirror, or any combination thereof.

20. The optical system of claim 17, wherein the second signal are obtained by two measurements for each spatial position of the first optical beam with respect to the second optical beam, wherein the relative phase between the first and the second optical beam is altered between the two measurements.

* * * * *